United States Patent
Higuchi et al.

(10) Patent No.: US 7,717,615 B2
(45) Date of Patent: May 18, 2010

(54) PROCESS AND APPARATUS FOR PRODUCING EMULSION AND MICROCAPSULES

(75) Inventors: Toshiro Higuchi, Yokohama (JP); Toru Torii, Tokyo (JP); Takashi Nishisako, Tokyo (JP); Tomohiro Taniguchi, Funabashi (JP)

(73) Assignee: Japan Science & Technology Agency, Kawaguchi-shi (JP)

( * ) Notice: Subject to any disclaimer, the term of this patent is extended or adjusted under 35 U.S.C. 154(b) by 762 days.

(21) Appl. No.: 11/287,253

(22) Filed: Nov. 28, 2005

(65) Prior Publication Data

US 2006/0077755 A1    Apr. 13, 2006

Related U.S. Application Data

(62) Division of application No. 10/468,015, filed as application No. PCT/JP02/01186 on Feb. 13, 2002, now Pat. No. 7,268,167.

(30) Foreign Application Priority Data

Feb. 23, 2001 (JP) ............... 2001-048097
Aug. 7, 2001 (JP) ............... 2001-238624

(51) Int. Cl.
B01F 5/00    (2006.01)

(52) U.S. Cl. .................. 366/341; 366/DIG. 4; 417/48

(58) Field of Classification Search ............... 366/341, 366/DIG. 4; 417/50, 48, 49
See application file for complete search history.

(56) References Cited

U.S. PATENT DOCUMENTS

| | | | |
|---|---|---|---|
| 535,267 A * | 3/1895 | Wagner et al. ........... 204/275.1 |
| 3,054,553 A * | 9/1962 | White ................... 315/111.91 |
| 3,885,180 A * | 5/1975 | Carts, Jr. ................. 313/103 R |
| 5,072,864 A | 12/1991 | Luhrsent et al. |
| 5,827,707 A | 10/1998 | Lamberti |
| 5,915,925 A | 6/1999 | North, Jr. |
| 6,146,103 A * | 11/2000 | Lee et al. ...................... 417/50 |
| 6,177,479 B1 | 1/2001 | Nakajima et al. |
| 6,258,858 B1 | 7/2001 | Nakajima et al. |
| 6,281,254 B1 | 8/2001 | Nakajima et al. |
| 2004/0134854 A1 | 7/2004 | Higuchi et al. |

FOREIGN PATENT DOCUMENTS

| | | |
|---|---|---|
| JP | 3012608 | 12/1999 |
| JP | 2000015070 A | 1/2000 |
| JP | 2000084384 A | 3/2000 |

* cited by examiner

Primary Examiner—David L Sorkin
(74) Attorney, Agent, or Firm—Oblon, Spivak, McClelland, Maier & Neustadt, L.L.P.

(57) ABSTRACT

In a process and apparatus for rapidly producing an emulsion and microcapsules in a simple manner, a dispersion phase is ejected from a dispersion phase-feeding port toward a continuous phase flowing in a microchannel in such a manner that flows of the dispersion phase and the continuous phase cross each other, thereby obtaining microdroplets, formed by a shear force of the continuous phase, having a size smaller than the width of the channel for feeding the dispersion phase.

2 Claims, 10 Drawing Sheets

PROCESS AND APPARATUS FOR PRODUCING EMULSION AND MICROCAPSULES

TECHNICAL FIELD

The present invention relates to a process and apparatus for producing a microemulsion and microcapsules in water, oil, and chemically inert liquid.

BACKGROUND ART

Conventionally, apparatuses for producing a microemulsion (containing microspheres) and microcapsules have been used in steps of manufacturing chemicals and some processes have been proposed. There are the following processes (see, for example, PCT Japanese Translation Patent Application Publication No. 8-508933): a process in which a second solution is dropped in a first solution, a process in which a first solution is dropped in the air from the inside portion of a double tube and a second solution is dropped from the outside portion thereof, and so on. Among processes for scattering droplets in the air, there is a process for ejecting droplets using piezoelectric elements used for inkjet printers and so on.

DISCLOSURE OF INVENTION

On the other hand, a technique in which monodispersed microdroplets are prepared with laboratory equipment is disclosed in Japanese Unexamined Patent Application publication No. 2000-84384. However, in this technique, there is a problem in that the rate of preparing such microdroplets is low and the microdroplets cannot be covered with surfactants or microcapsule shells. Furthermore, only microdroplets having a diameter three times larger than the width of microchannels can be prepared.

In view of the above situation, it is an object of the present invention to provide a process and apparatus for rapidly producing an emulsion and microcapsules in a simple manner.

In order to achieve the above object, the present invention provides the following methods and apparatuses.

(1) A process for producing an emulsion includes a step of ejecting a dispersion phase from a dispersion phase-feeding port toward a continuous phase flowing in a microchannel in such a manner that flows of the dispersion phase and the continuous phase cross each other, whereby microdroplets are formed by the shear force of the continuous phase and the size of the microdroplets is controlled.

(2) A process for producing microcapsules includes a step of feeding a shell-forming phase and a content-forming phase to a continuous phase flowing in a microchannel, in such a manner that flows of the shell-forming phase and the content-forming phase join the flow of the continuous phase, to obtain microcapsules, wherein the shell-forming phase is fed from positions upstream to positions for feeding the content-forming phase in such a manner that the shell-forming phase forms a thin layer.

(3) A process for producing an emulsion includes a step of ejecting a dispersion phase toward the junction of flows of continuous phases flowing in microchannels extending in the directions opposite to each other, in such a manner that the flow of the dispersion phase joins the flows of the continuous phases, to obtain microdroplets.

(4) A process for producing microcapsules includes a step of feeding a content-forming phase to first and second continuous phases flowing in first and second microchannels extending in the directions opposite to each other, in such a manner that the flow of the content-forming phase joins the flows of the first and second continuous phases, to form microdroplets for forming contents; and then feeding a shell-forming phase to third and fourth continuous phases flowing in third and fourth microchannels, in such a manner that the flow of the shell-forming phase joins the junction of flows of the third and fourth continuous phases, to form microdroplets for forming shells to obtain microcapsules.

(5) A process for producing an emulsion includes a step of allowing flows of a first continuous phase and a dispersion phase to join together at a first junction to form a two-phase flow and then allowing the two-phase flow, consisting of the flows of the first continuous phase and the dispersion phase joined together, to join a flow of a second continuous phase at a second junction to form an emulsion containing the dispersion phase.

(6) A process for producing microcapsules includes a step of allowing flows of a first continuous phase and a dispersion phase to join together at a first junction to form microdroplets and then allowing the flow of the first continuous phase containing the microdroplets to join a flow of a second continuous phase at a second junction to form microcapsules containing the first continuous phase containing the microcapsules.

(7) An apparatus for producing an emulsion includes means for forming a continuous phase flowing in a microchannel, means for feeding a dispersion phase to the continuous phase in such a manner that flows of the continuous phase and the dispersion phase cross each other, dispersion phase-ejecting means for ejecting the dispersion phase from a dispersion phase-feeding port, and means for forming microdroplets by the shear force of the continuous phase to control the size of the microdroplets.

(8) An apparatus for producing microcapsules includes means for forming a continuous phase flowing in a microchannel, means for feeding a shell-forming phase and a content-forming phase to a dispersion phase in such a manner that flows of the shell-forming phase and content-forming phase join the flow of the continuous phase, and means for feeding the shell-forming phase from positions upstream to positions for feeding the content-forming phase in such a manner that shell-forming phase forms a thin layer.

(9) An apparatus for producing an emulsion includes means for forming continuous phases flowing in microchannels extending in the directions opposite to each other; and means for ejecting a dispersion phase toward the junction of flows of the continuous phases, in such a manner that the flow of the dispersion phase joins the flows of the continuous phases, to obtain microdroplets.

(10) An apparatus for producing microcapsules includes means for feeding a content-forming phase to first and second continuous phases flowing in first and second microchannels extending in the directions opposite to each other, in such a manner that the flow of the content-forming phase joins the flows of the first and second continuous phases, to form microdroplets for forming contents; and then feeding a shell-forming phase to third and fourth continuous phases flowing in third and fourth microchannels, in such a manner that the flow of the shell-forming phase joins the junction of flows of the third and fourth continuous phases, to form coatings for forming shells to obtain microcapsules.

(11) In the emulsion-producing apparatus described in the above article (7) or (9), the means for feeding a plurality of the dispersion phases each include a substrate, a driven plate, an elastic member disposed between the substrate and the driven plate, and an actuator for driving the driven plate and thereby a plurality of the dispersion phases are fed at the same time.

(12) In the microcapsule-producing apparatus described in the above article (8) or (10), the means for feeding a plurality of shell-forming phases and content-forming phases each include a substrate, a driven plate, an elastic member disposed between the substrate and the driven plate, and an actuator for driving the driven plate, and thereby a plurality of the shell-forming phases and content-forming phases are fed at the same time.

(13) The emulsion-producing apparatus described in the above article (7) or (9) further includes films, disposed on portions of inner wall surfaces of the microchannel in which the continuous phase flows and the channel for feeding the dispersion phase, for readily forming the microdroplets, wherein the portions include the junction of the flows of the continuous phase and the dispersion phase and the vicinity of the junction.

(14) The microcapsule-producing apparatus described in the above article (8) or (10) further includes films, disposed on portions of inner wall surfaces of the microchannel in which the continuous phase flows and the channel for feeding the dispersion phase, for readily forming the microdroplets, wherein the portions include the junction of the flows of the continuous phase and the dispersion phase and the vicinity of the junction.

(15) An apparatus for producing an emulsion includes a substrate having parallel electrodes and a microchannel disposed on the substrate, wherein a dispersion phase disposed at the upstream side of the microchannel is attracted and then ejected by a moving electric field, applied to the parallel electrodes, to form the emulsion.

(16) In the emulsion-producing apparatus described in the above article (15), the arrangement of the parallel electrodes disposed at the side close to the continuous phase is changed, whereby the formed emulsion is guided in a predetermined direction.

(17) In the emulsion-producing apparatus described in the above article (15), the speed of motion the moving electric field applied to the parallel electrodes is varied, whereby the forming rate of the emulsion is varied.

(18) An apparatus for producing an emulsion includes an elastic member disposed between rigid members, placed at a lower section of a liquid chamber for a dispersion phase, having a plurality of microchannels therein; an actuator for applying a stress to the elastic member; and a continuous phase communicatively connected to a plurality of the microchannels.

(19) In the emulsion-producing apparatus described in the above article (18), a plurality of the microchannels each have a section, of which the diameter is decreased, having a tapered portion.

(20) In the emulsion-producing apparatus described in the above article (18), a plurality of the microchannels each have a lower section, of which the diameter is decreased, having a first tapered portion and also each have a protrusion having a second tapered portion for increasing the diameter of a further lower section.

BEST MODES FOR CARRYING OUT THE INVENTION

Embodiments of the present invention will now be described in detail.

Figure 1:
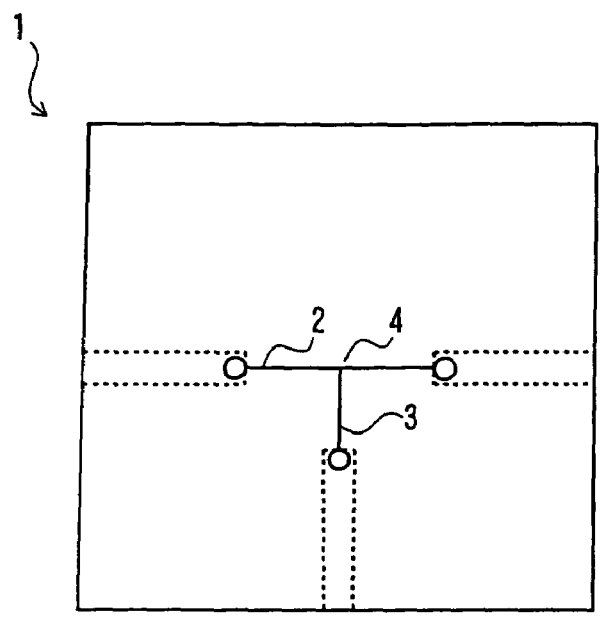
FIG. 1 is a plan view showing a microdroplet-producing apparatus according to a first embodiment of the present invention.
Figure 2:
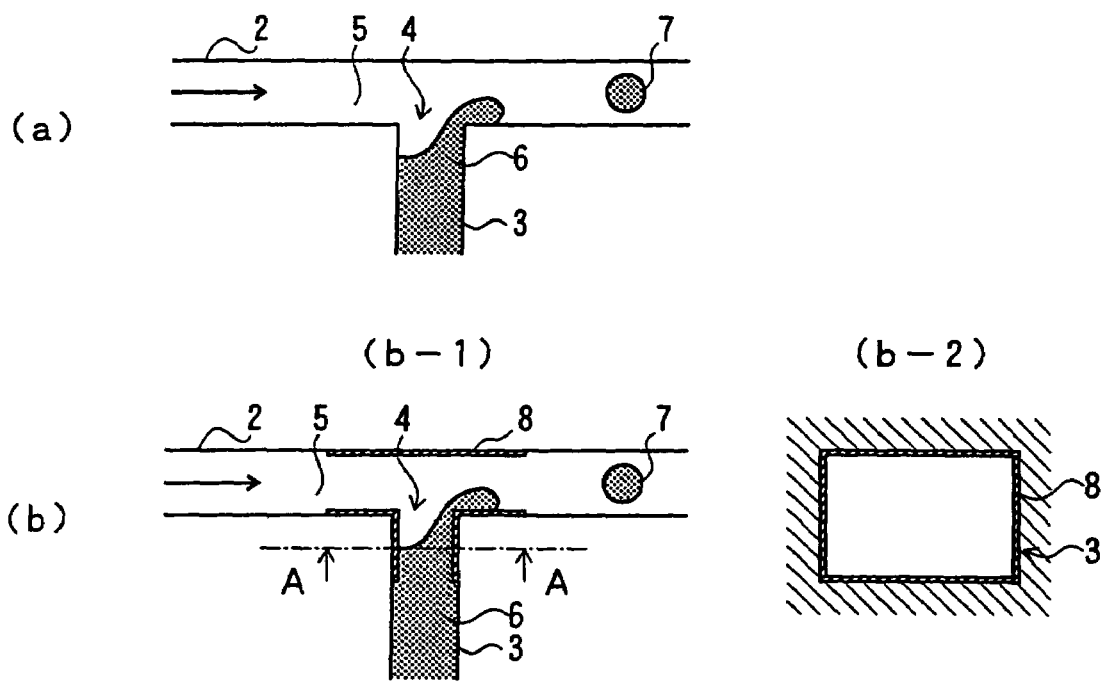
FIG. 2 is an illustration showing microdroplet-producing processes according to the first embodiment of the present invention.

FIG. 1 is a plan view showing an apparatus for producing microdroplets according to a first embodiment of the present invention, and FIG. 2 is an illustration showing processes for producing such microdroplets. FIG. 2(*a*) is an illustration showing a microdroplet-producing process (No. 1), FIG. 2(*b*) is another illustration showing a microdroplet-producing process (No. 2), FIG. 2(*b*-1) is a fragmentary sectional view thereof, and FIG. 2(*b*-2) is the sectional view of FIG. 2(*b*-1) taken along the line A-A.

In these figures, reference numeral 1 represents a main body of the microdroplet-producing apparatus, reference numeral 2 represents a microchannel in which a continuous phase flows and which is disposed in the main body 1, reference numeral 3 represents a dispersion phase-feeding channel placed such that the dispersion phase-feeding channel 3 and the microchannel 2 cross, reference numeral 4 represents a dispersion phase-feeding port, reference numeral 5 represents the continuous phase (for example, oil), reference numeral 6 represents a dispersion phase (for example, water), reference numeral 7 represents a microdroplet, and reference numeral 8 represents hydrophobic film.

In the above configuration, the dispersion phase 6 is fed to the continuous phase 5 flowing in the microchannel 2 in such a manner that flows of the dispersion phase 6 and the continuous phase 5 cross each other, as shown in FIG. 2. Part of the continuous phase 5 extends through each dispersion phase-feeding port 4, thereby producing the microdroplets 7 having a diameter smaller than the width of the dispersion phase-feeding channel 3.

For example, microdroplets having a diameter of about 25 μm can be obtained when the pressure of the dispersion phase (water) 6 is set to 2.45 kPa, the pressure of the continuous phase (oil containing 70% of oleic acid) 5 is set to 4.85 kPa, and the microchannel 2 and the dispersion phase-feeding channel 3 have a width of 100 μm and a height of 100 μm. When the pressure of the continuous phase is set to 5.03 kPa, microdroplets having a diameter of about 5 μm can be obtained.

As shown in FIGS. 2(*b*-1) and 2(*b*-2), in order to readily form the microdroplets 7 (in order to readily repelling the microdroplets), the hydrophobic films 8 are preferably disposed on portions of the inner walls of the microchannel 2, in which the continuous phase 5 flows, and the dispersion phase-feeding channel 3, wherein the portions are disposed at the vicinity of the junction of the flows of the continuous phase (for example, oil) 5 and the dispersion phase (for example, water) 6.

In the above embodiment, since the continuous phase 5 contains oil and the dispersion phase 6 contains water, the hydrophobic films 8 are preferably used. However, when the continuous phase contains water and the dispersion phase contains oil, hydrophilic films are preferably used.

Figure 3:
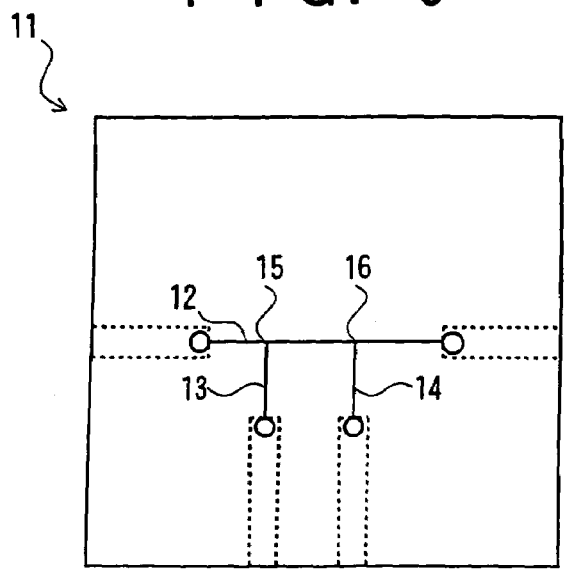
FIG. 3 is a plan view showing a microcapsule-producing apparatus according to a second embodiment of the present invention.
Figure 4:
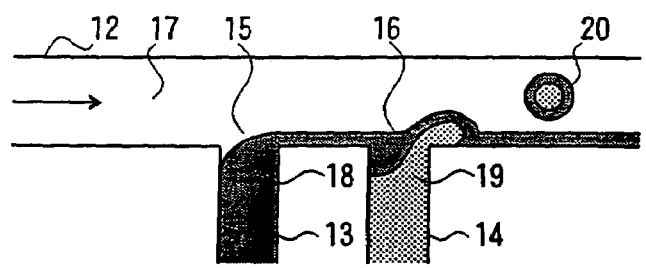
FIG. 4 is an illustration showing a microcapsule-producing process according to the second embodiment of the present invention.

FIG. 3 is a plan view showing an apparatus for producing microcapsules according to a second embodiment, and FIG. 4 is an illustration showing a process for producing such microcapsules.

In these figures, reference numeral 11 represents a main body of the microcapsule-producing apparatus, reference numeral 12 represents a microchannel in which a continuous phase flows and which is disposed in the main body 11, reference numeral 13 represents a shell-forming phase-feeding channel placed such that the shell-forming phase-feeding channel 13 and the microchannel 12 cross, reference numeral 14 represents a content-forming phase-feeding channel placed such that the content-forming phase-feeding channel 14 and the microchannel 12 cross, reference numeral 15 represents a shell-forming phase-feeding port, reference numeral 16 represents a content-forming phase-feeding port, reference numeral 17 represents the continuous phase (for example, water), reference numeral 18 represents a shell-forming phase, reference numeral 19 represents a content-forming phase, and reference numeral 20 represents a microcapsule.

In the above configuration, the shell-forming phase 18 and the content-forming phase 19 are fed to the continuous phase 17 flowing in the microchannel 12 in such a manner that flows of the shell-forming phase 18 and the content-forming phase 19 join the flow of the continuous phase 17, as shown in FIG. 4. The shell-forming phase 18 is fed from positions upstream to positions for feeding the content-forming phase 19 in such a manner that shell-forming phase 18 forms a thin layer.

Figure 5:
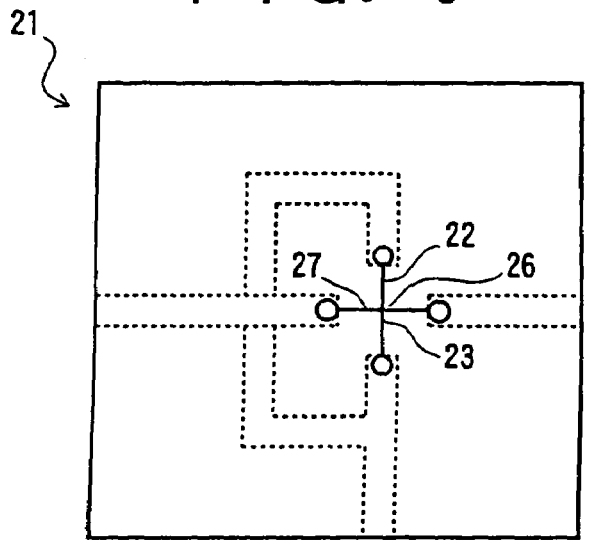
FIG. 5 is a plan view showing a microdroplet-producing apparatus according to a third embodiment of the present invention.
Figure 6:
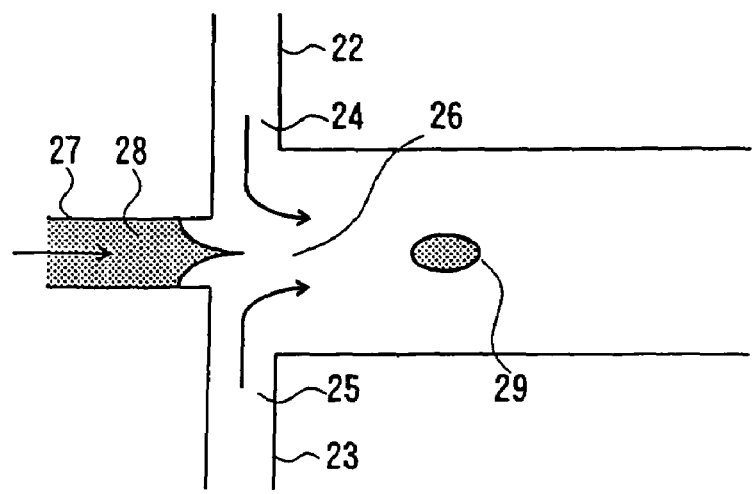
FIG. 6 is an illustration showing a microdroplet-producing process according to the third embodiment of the present invention.

FIG. 5 is a plan view showing an apparatus for producing microdroplets according to a third embodiment, and FIG. 6 is an illustration showing a process for producing such microdroplets.

In these figures, reference numeral 21 represents a main body of the microdroplet-producing apparatus, reference numeral 22 represents a first microchannel, reference numeral 23 represents a second microchannel, reference numeral 24 represents a first continuous phase, reference numeral 25 represents a second continuous phase, reference numeral 26 represents the junction of flows of the first continuous phase 24 and the second continuous phase 25, reference numeral 27 represents a dispersion phase-feeding channel, reference numeral 28 represents a dispersion phase, and reference numeral 29 represents a microdroplet.

In the above configuration, the dispersion phase 28 is ejected toward the junction 26 of flows of the first continuous phase 24 and the second continuous phase 25 flowing in the microchannels 22 and 23, respectively, in such a manner that the flow of the dispersion phase 28 joins the flows of the first continuous phase 24 and the second continuous phase 25, as shown in FIG. 6. Thereby, the microdroplets 29 can be produced.

Figure 7:
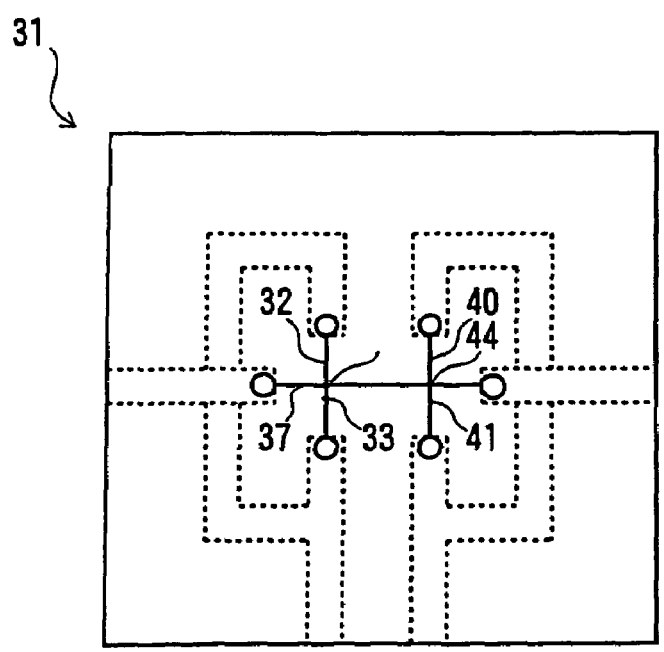
FIG. 7 is a plan view showing a microcapsule-producing apparatus according to a fourth embodiment of the present invention.
Figure 8:
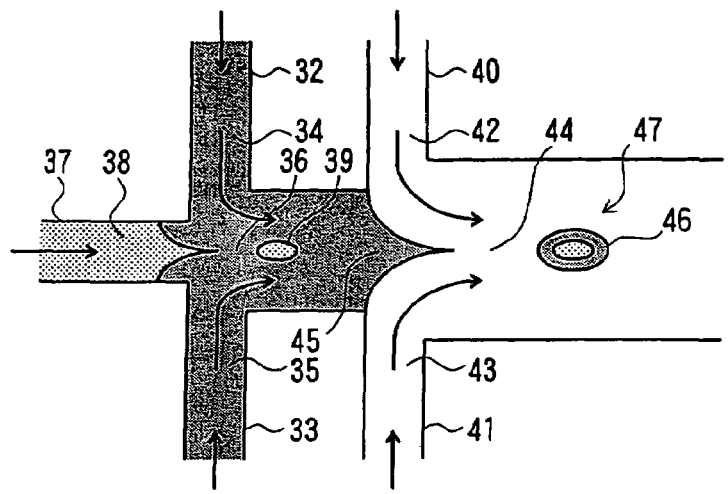
FIG. 8 is an illustration showing a microcapsule-producing process according to the fourth embodiment of the present invention.

FIG. 7 is a plan view showing an apparatus for producing microcapsules according to a fourth embodiment, and FIG. 8 is an illustration showing a process for producing such microcapsules.

In these figures, reference numeral 31 represents a main body of the microcapsule-producing apparatus, reference numeral 32 represents a first microchannel in which a continuous phase flows and which is disposed in the main body 31, reference numeral 33 represents a second microchannel in which another continuous phase flows and which is disposed in the main body 31, reference numeral 34 represents a first continuous phase (for example, oil), reference numeral 35 represents a second continuous phase (for example, oil), reference numeral 36 represents the junction of flows of the first continuous phase 34 and the second continuous phase 35, reference numeral 37 represents a content-forming, phase-feeding channel, reference numeral 38 represents a content-forming phase (for example, water), reference numeral 39 represents a microdroplet (for example, water spheres), reference numeral 40 represents a third microchannel in which another continuous phase flows and which is disposed in the main body 31, reference numeral 41 represents a fourth microchannel in which another continuous phase flows and which is disposed in the main body 31, reference numeral 42 represents a third continuous phase (for example, water), reference numeral 43 represents a fourth continuous phase (for example, water), reference numeral 44 represents the junction of flows of the third continuous phase 42 and the fourth continuous phase 43, reference numeral 45 represents a shell-forming phase, reference numeral 46 represents a shell-forming microdroplet, and reference numeral 47 represents a microcapsule.

In the above configuration, the content-forming phase 38 is fed to the continuous phases 34 and 35 flowing in the first and second microchannels 32 and 33, respectively, in such a manner that the flow of the content-forming phase 38 joins the flows of the continuous phases 34 and 35. Thereby, the microdroplets 39 for forming contents are formed.

Subsequently, the shell-forming phase 45 containing the first and second continuous phases 34 and 35 mixed together is fed to the continuous phases 42 and 43 flowing in the third and fourth microchannels 40 and 41 in such a manner that the flow of the shell-forming phase 45 joins the junction of the flows of the third and fourth continuous phases 42 and 43. Thereby, a coating for forming a shell is formed on each microdroplet 39 for forming a content, thereby forming each microcapsule 47.

In this embodiment, the microcapsule 47 contains the single microdroplet 39. However, the microcapsule 47 may contain a plurality of the microdroplets 39.

Figure 9:
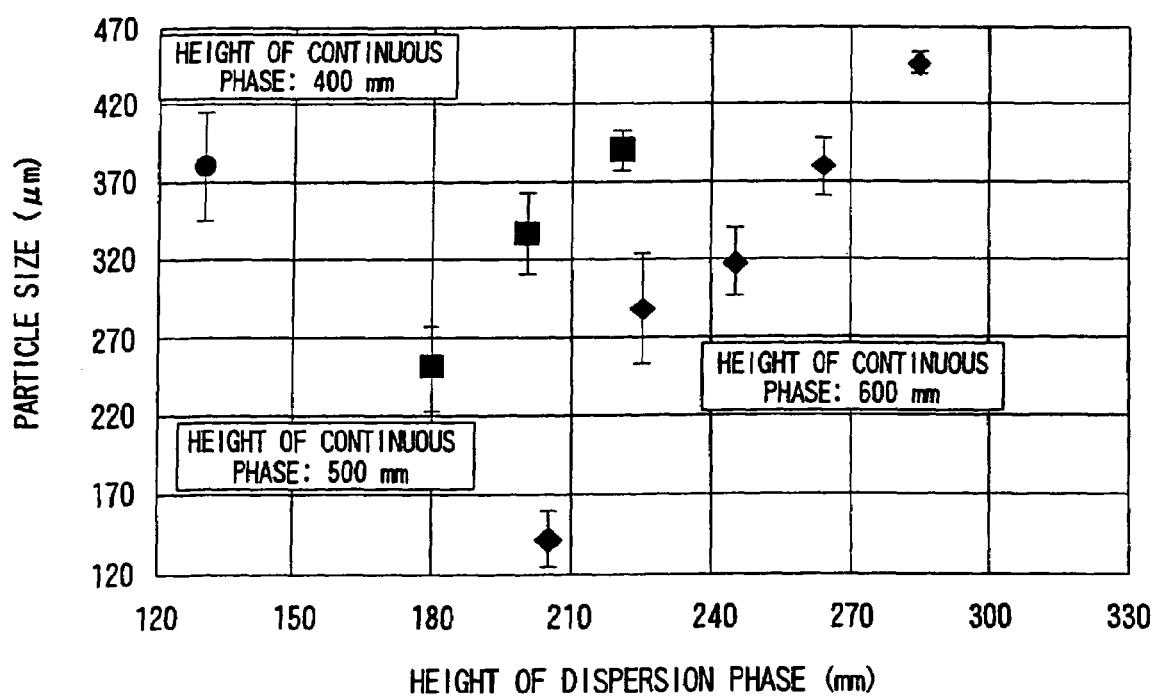
FIG. 9 is an illustration showing the particle size obtained by varying the height of the continuous phases and dispersion phases in the fourth embodiment of the present invention.

FIG. 9 shows the particle size obtained by varying the height (which can be converted into the pressure) of the continuous phases and dispersion phases, when the first and second microchannels 32 and 33 and the content-forming phase-feeding channel 37 have a width of 100 μm and a height of 100 μm and the channel in which the microdroplets 39 are present have a width of 500 μm and a height of 100 μm. It is clear that the particle size can be controlled by varying the height (which can be converted into the pressure) of the continuous phases and dispersion phases.

Figure 10:
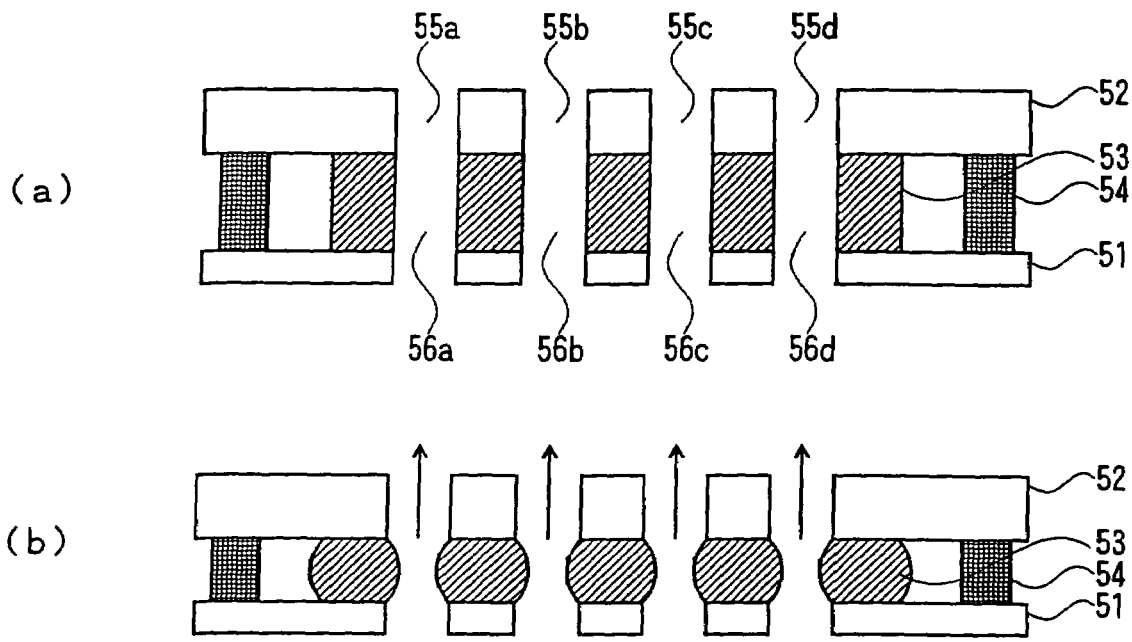
FIG. 10 is an illustration showing a mechanism for ejecting a dispersion phase, a shell-forming phase, or a content-forming phase placed in a microdroplet-producing apparatus according to a fifth embodiment of the present invention.

FIG. 10 is an illustration showing a mechanism for ejecting a dispersion phase, a shell-forming phase, or a content-forming phase placed in a microdroplet-producing apparatus according to a fifth embodiment of the present invention. FIG. 10(a) is an illustration showing such a situation that piezoelectric actuators are expanded and therefore such a phase is not ejected, and FIG. 10(b) is an illustration showing such a situation that the piezoelectric actuators are contracted to eject the phase.

In these figures, reference numeral 51 represents a substrate, reference numeral 52 represents a driven plate, reference numeral 53 represents rubber, reference numeral 54 represents the piezoelectric actuators each disposed at the corresponding ends of the driven plate 52, reference numerals 55a-55d represent a plurality of feeding ports, and reference numerals 56a-56d represent a plurality of channels arranged for a single dispersion phase. A back pressure is applied to the bottom portion of the dispersion phase.

As shown in FIG. 10(a), a plurality of the channels 56a-56d are arranged, and the dispersion phase can be ejected therefrom at the same time when the piezoelectric actuators 54 are contracted, as shown in FIG. 10(b).

Various actuators may be used instead of the above piezoelectric actuators.

Figure 11:
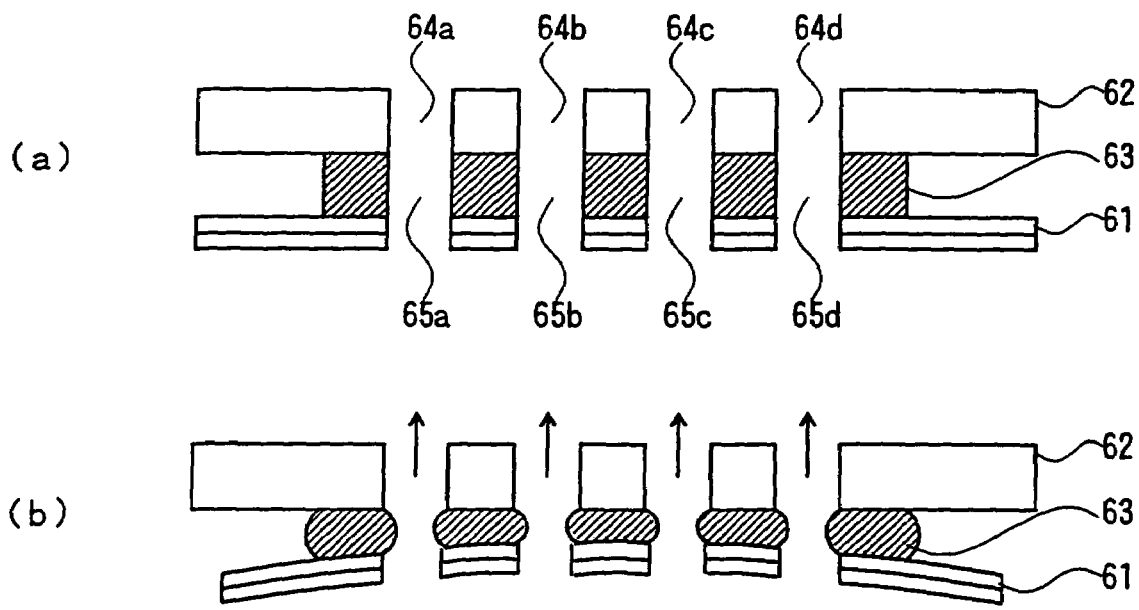
FIG. 11 is an illustration showing a mechanism for ejecting a dispersion phase, a shell-forming phase, or a content-forming phase placed in a microdroplet-producing apparatus according to a sixth embodiment of the present invention.

FIG. 11 is an illustration showing a mechanism for ejecting a dispersion phase, a shell-forming phase, or a content-forming phase placed in a microdroplet-producing apparatus according to a sixth embodiment of the present invention. FIG. 11(a) is an illustration showing such a situation that a bimorph actuator is not warped and therefore such a phase is not ejected, and FIG. 11(b) is an illustration showing such a situation that the bimorph actuator is warped, thereby ejecting the phase.

In these figures, reference numeral 61 represents the bimorph actuator, reference numeral 62 represents a fixed plate, reference numeral 63 represents rubber, reference numerals 64a-64d represent a plurality of feeding ports, and reference numerals 65a-65d represent a plurality of channels arranged for a single dispersion phase. A back pressure is applied to the bottom portion of the dispersion phase.

As shown in FIG. 11(a), a plurality of the channels 65a-65d are arranged, and the dispersion phase can be ejected therefrom at the same time by the operation (upward warping) of the bimorph actuator 61, as shown in FIG. 11(b).

Figure 12:
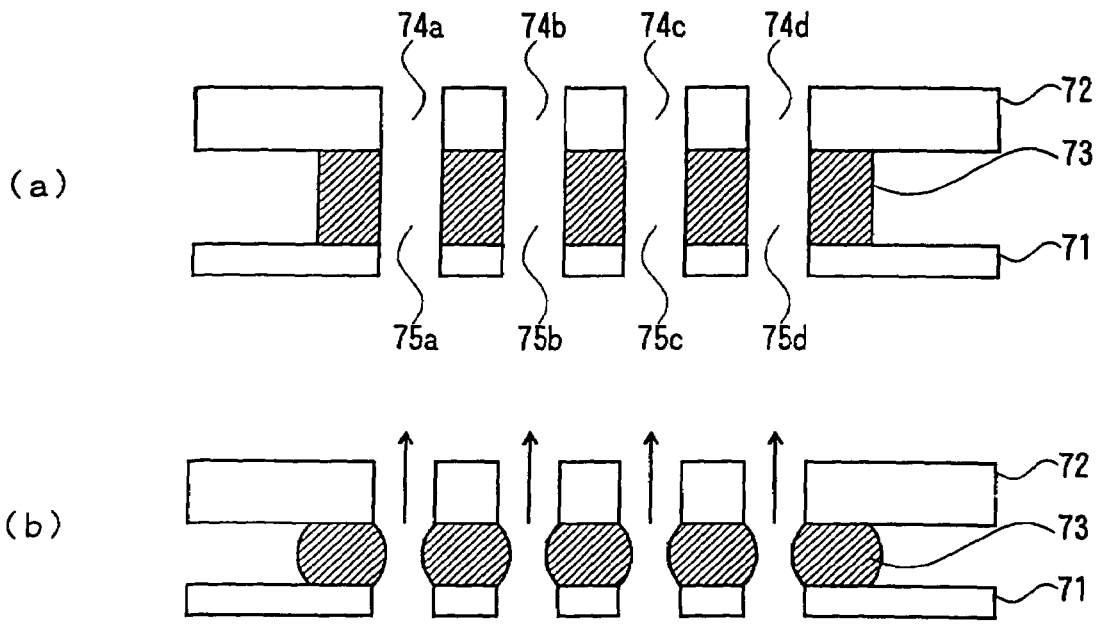
FIG. 12 is an illustration showing a mechanism for ejecting a dispersion phase, a shell-forming phase, or a content-forming phase placed in a microdroplet-producing apparatus according to a seventh embodiment of the present invention.

FIG. 12 is an illustration showing a mechanism for ejecting a dispersion phase, a shell-forming phase, or a content-forming phase placed in a microdroplet-producing apparatus according to a seventh embodiment of the present invention. FIG. 12(a) is an illustration showing such a situation that an electrostrictive polymer is not energized and therefore such a phase is not ejected, and FIG. 12(b) is an illustration showing such a situation that the electrostrictive polymer is energized (contracted), thereby ejecting the phase.

In these figures, reference numeral 71 represents a substrate, reference numeral 72 represents a driven plate, reference numeral 73 represents the electrostrictive polymer, reference numerals 74a-74d represent a plurality of feeding ports, and reference numerals 75a-75d represent a plurality of channels arranged for a single dispersion phase. A back pressure is applied to the bottom portion of the dispersion phase.

As shown in FIG. 12(a), a plurality of the channels 75a-75d are arranged, and the dispersion phase can be ejected therefrom at the same time by the operation (contraction) of the electrostrictive polymer 73, as shown in FIG. 12(b).

Figure 13:
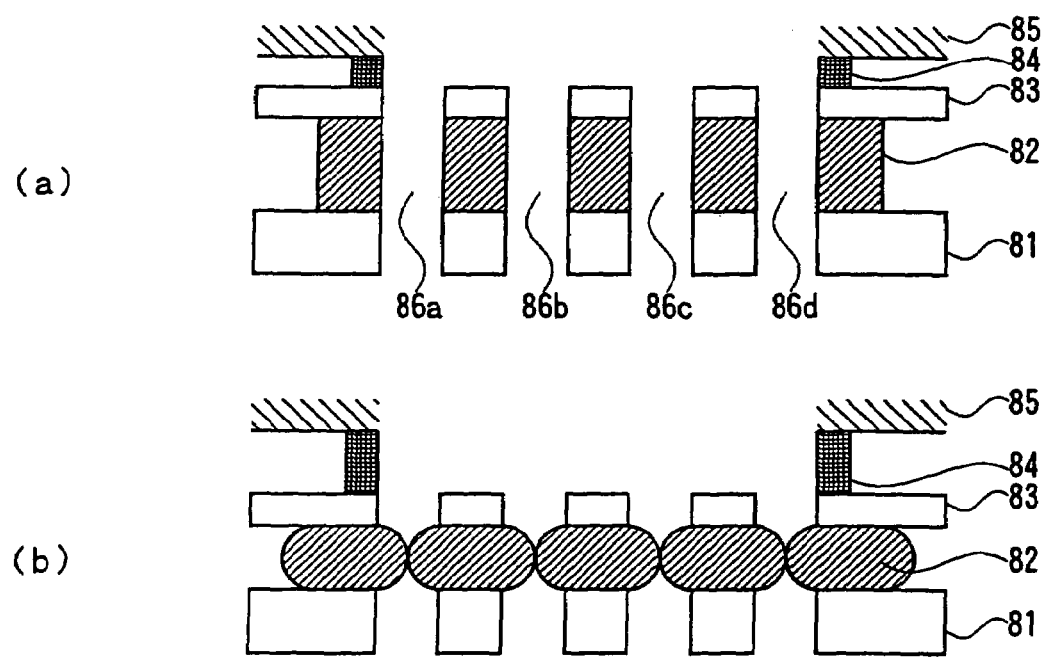
FIG. 13 is an illustration showing a mechanism for opening or closing a dispersion phase-feeding port of a microdroplet-producing apparatus according to an eighth embodiment of the present invention.

FIG. 13 is an illustration showing a mechanism for opening or closing a dispersion phase-feeding port of a microdroplet-producing apparatus according to an eighth embodiment of the present invention. FIG. 13(a) is an illustration showing such a situation that piezoelectric actuators are not energized (contracted) and therefore gates for a phase are opened, and FIG. 13(b) is an illustration showing such a situation that the piezoelectric actuators are energized (expanded) and thereby the gates for the phase are closed.

In these figures, reference numeral 81 represents a substrate, reference numeral 82 represents rubber, reference numeral 83 represents a driven plate, reference numeral 84 represents the piezoelectric actuators, reference numeral 85 represent a fixed plate, and reference numerals 86a-86d represent a plurality of the gates.

As shown in these figures, a plurality of the gates 86a-86d are arranged, and all the gates for the phase can be closed by the operation of the two piezoelectric actuators 84 disposed at both sides.

Various actuators may be used instead of the above actuators.

Figure 14:
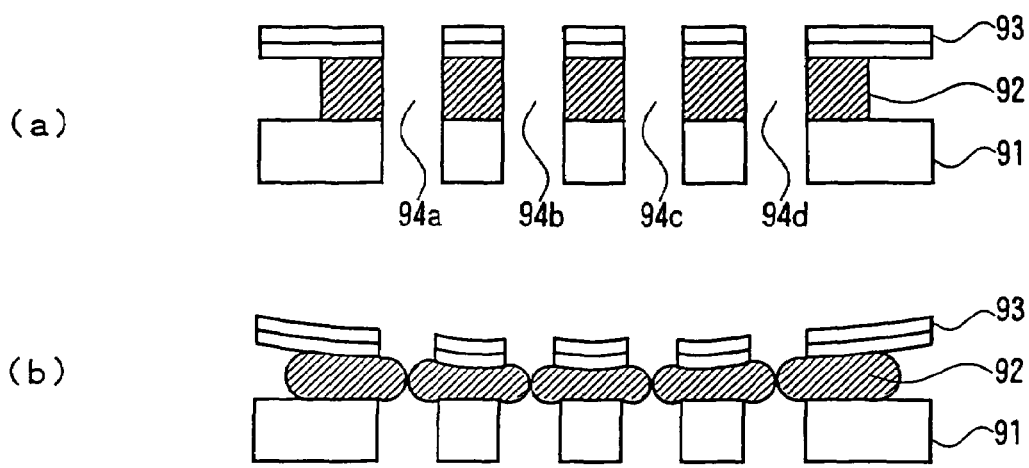
FIG. 14 is an illustration showing a mechanism for opening or closing a dispersion phase-feeding port of a microdroplet-producing apparatus according to a ninth embodiment of the present invention.

FIG. 14 is an illustration showing a mechanism for opening or closing a dispersion phase-feeding port of a microdroplet-producing apparatus according to a ninth embodiment of the present invention. FIG. 14(a) is an illustration showing such a situation that a bimorph actuator is not energized (not warped) and therefore gates for a phase are opened, and FIG. 14(b) is an illustration showing such a situation that the bimorph actuator is energized (warped downward) and thereby the gates for the phase are closed.

In these figures, reference numeral 91 represents a substrate, reference numeral 92 represents rubber, reference numeral 93 represents the bimorph actuator, and reference numerals 94a-94d represent a plurality of the gates.

As shown in these figures, a plurality of the gates 94a-94d are arranged, and all the gates can be closed at the same time by the operation of the bimorph actuator 93.

Figure 15:
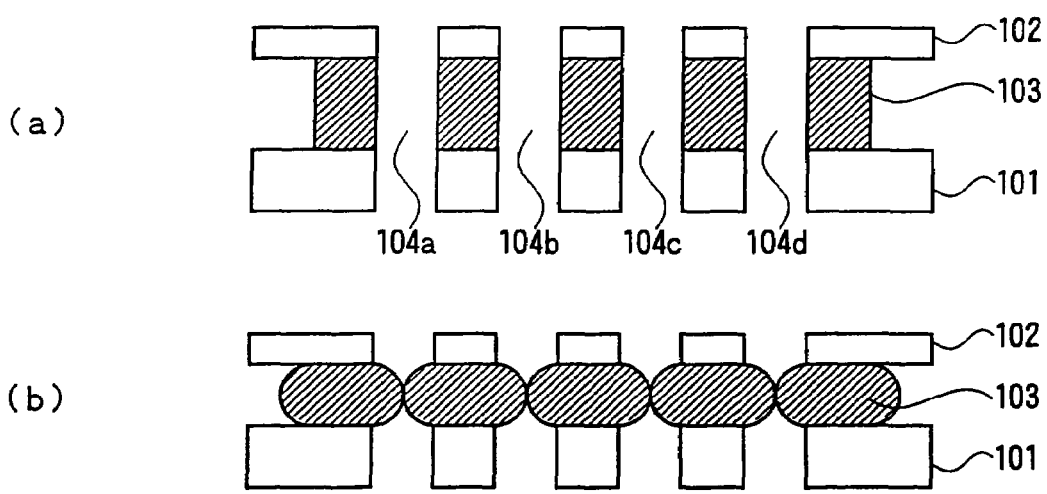
FIG. 15 is an illustration showing a mechanism for opening or closing a dispersion phase-feeding port of a microdroplet-producing apparatus according to a tenth embodiment of the present invention.

FIG. 15 is an illustration showing a mechanism for opening or closing a dispersion phase-feeding port of a microdroplet-producing apparatus according to a tenth embodiment of the present invention. FIG. 15(a) is an illustration showing such a situation that an electrostrictive polymer is not energized and therefore gates for a phase are opened, and FIG. 15(b) is an illustration showing such a situation that the electrostrictive polymer is energized (contracted) and thereby the gates for the phase are closed.

In these figures, reference numeral 101 represents a substrate, reference numeral 102 represents a driven plate, reference numeral 103 represents the electrostrictive polymer, and reference numerals 104a-104d represent a plurality of the gates.

As shown in FIG. 15(a), a plurality of the gates 104a-104d are opened when the electrostrictive polymer 103 is not energized (expanded). As shown in FIG. 15(b), a plurality of the gates 104a-104d are closed at the same time when the electrostrictive polymer 103 is energized (contracted).

Figure 16:
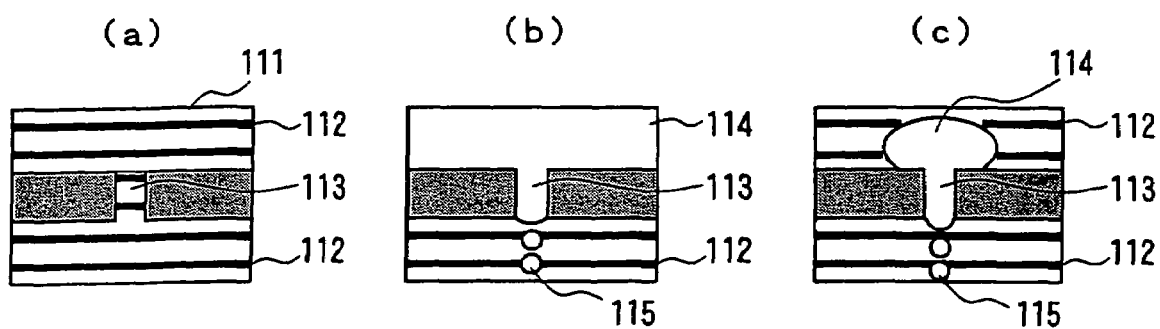
FIG. 16 is a plan view showing an emulsion-producing apparatus according to an eleventh embodiment of the present invention.

FIG. 16 is a plan view showing an emulsion-producing apparatus according to an eleventh embodiment of the present invention. FIG. 16(a) is a plan view showing the emulsion-producing apparatus to which a dispersion phase has not been introduced yet, FIG. 16(b) is a plan view showing the emulsion-producing apparatus to which liquid has been charged, and FIG. 16(c) is an illustration showing such a situation that a large droplet is set for the emulsion-producing apparatus and microdroplets (emulsion) are produced due to a moving electric field induced by static electricity.

In these figures, reference numeral 111 represents a substrate, reference numeral 112 represents electrodes disposed on the substrate 111, reference numeral 113 represents a microchannel disposed above the substrate 111 having the electrodes 112 thereon, reference numeral 114 represents a dispersion phase, and reference numeral 115 represents an emulsion formed by causing the dispersion phase 114 to pass through the microchannel 113.

In this embodiment, the electrodes 112 are arranged so as to be perpendicular to the microchannel 113, and a moving electric field is applied to the electrodes 112, thereby forming the emulsion 115. The emulsion 115 is guided in the direction perpendicular to the electrodes (in the downward direction herein) depending on the moving electric field induced by the static electricity applied to the electrodes 112.

The rate of forming the microdroplets can be changed by varying the moving speed of the moving electric field.

Figure 17:
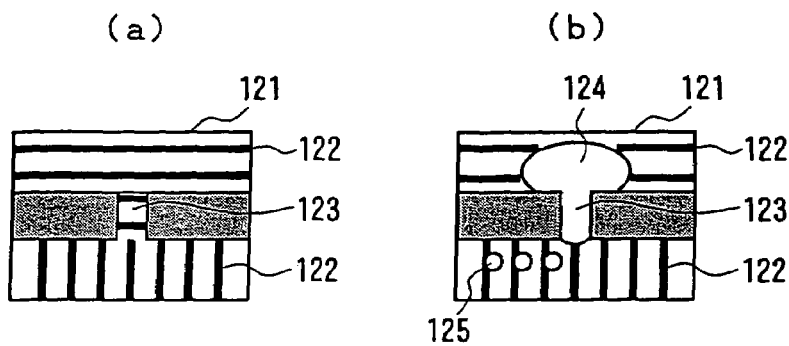
FIG. 17 is a plan view showing an emulsion-producing apparatus according to a twelfth embodiment of the present invention.

FIG. 17 is a plan view showing an emulsion-producing apparatus according to a twelfth embodiment of the present invention. FIG. 17(a) is a plan view showing the emulsion-producing apparatus to which a dispersion phase has not been introduced yet, and FIG. 17(b) is an illustration showing such a situation that the dispersion phase is introduced to the emulsion-producing apparatus, thereby forming an emulsion.

In these figures, reference numeral 121 represents a substrate, reference numeral 122 represents electrodes disposed on the substrate 121, reference numeral 123 represents a microchannel disposed above the substrate 121 having the electrodes 122 thereon, reference numeral 124 represents a dispersion phase, and reference numeral 125 represents an emulsion formed by causing the dispersion phase 124 to pass through the microchannel 123.

In this embodiment, on the exit side of the microchannel 123, the electrodes 122 are vertically arranged and thereby the formed emulsion 125 is guided in the horizontal direction depending on a static electricity applied to the electrodes 122.

Figure 18:
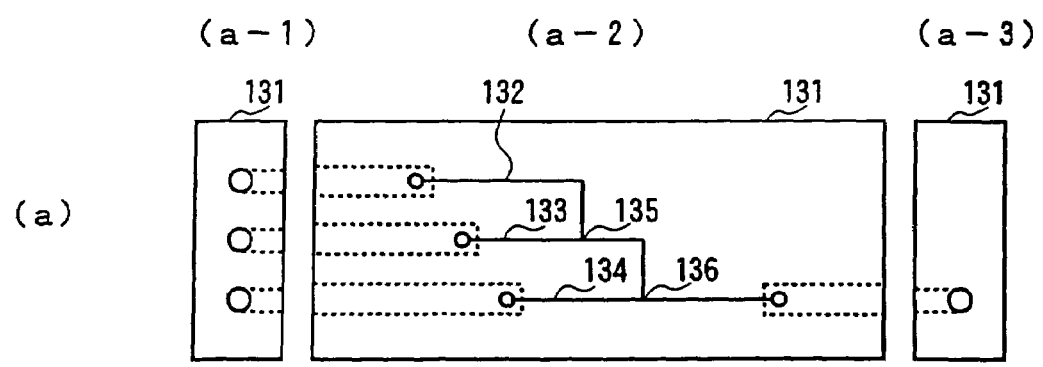
FIG. 18 is an illustration showing an emulsion-forming apparatus according to a thirteenth embodiment of the present invention.
Figure 18:
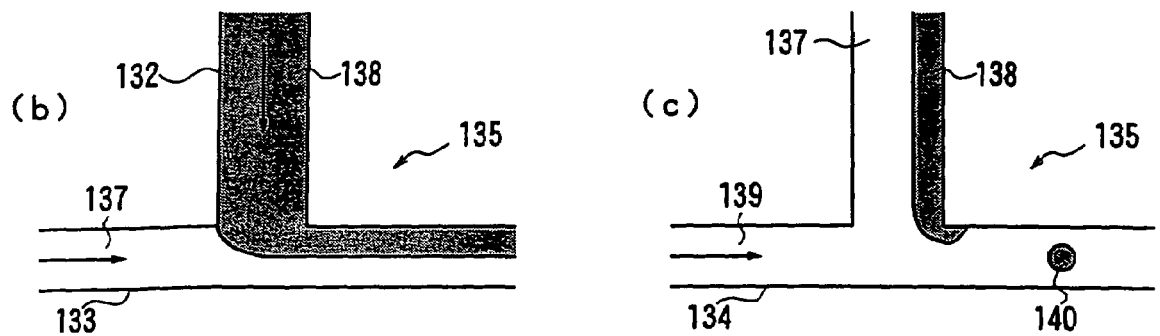

FIG. 18 is an illustration showing an emulsion-forming apparatus according to a thirteenth embodiment of the present invention. FIG. 18(a) is a schematic view showing the total configuration of the monodispersed emulsion-forming apparatus, and FIG. 18(a-1) is the left side elevational view thereof, FIG. 18(a-2) is a schematic plan view thereof, FIG. 18(a-3) is the right side elevational view thereof. FIG. 18(b) is an illustration showing a first junction, and FIG. 18(C) is an illustration showing a second junction.

In these figures, reference numeral 131 represents a main body of the emulsion-forming apparatus, reference numeral 132 represents a microchannel in which a dispersion phase flows, reference numeral 133 represents a microchannel in which a first continuous phase flows, reference numeral 134 represents a microchannel in which a second continuous phase flows, reference numeral 135 represents the first junction at which flows of the dispersion phase and the first continuous phase are joined together, reference numeral 136 represents the second junction at which flows of the dispersion phase, the first continuous phase, and the second continuous phase are joined together, reference numeral 137 represents the first continuous phase, reference numeral 138 represents the dispersion phase, reference numeral 139 represents the second continuous phase, and reference numeral 140 represents a formed emulsion.

In this embodiment, the flows of the dispersion phase 138 and the first continuous phase 137 are joined together at the first junction 135, thereby forming a two-phase flow containing the first continuous phase 137 and the dispersion phase 138. At the second junction 136, a flow of the second continuous phase 139 and the two-phase flow containing the first continuous phase 137 and the dispersion phase 138 are joined together, and thereby the emulsion 140 is formed from the dispersion phase 138.

According to this embodiment, there is an advantage in that an emulsion having a size smaller than the width of channels can be readily formed.

Figure 19:
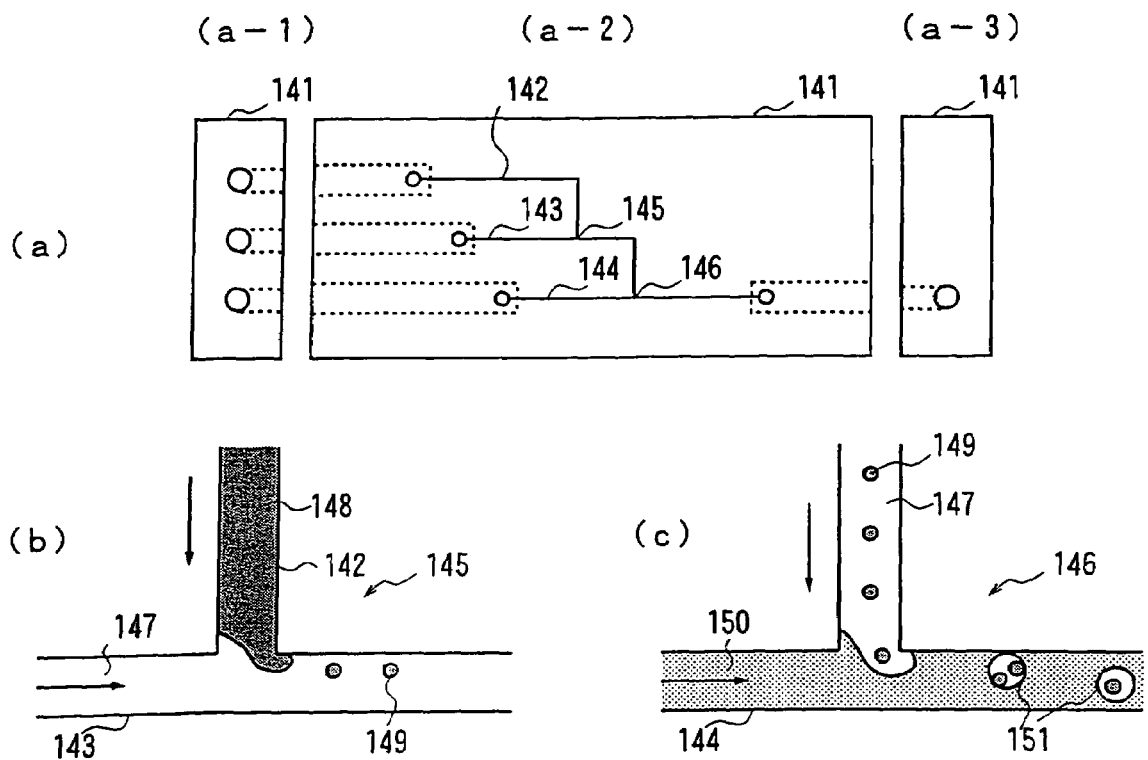
FIG. 19 is an illustration showing a microcapsule-forming apparatus according to a fourteenth embodiment of the present invention.

FIG. 19 is an illustration showing a microcapsule-forming apparatus according to a fourteenth embodiment of the present invention. FIG. 19(a) is a schematic view showing the total configuration of the microcapsule-forming apparatus, and FIG. 19(a-1) is the left side elevational view thereof, FIG. 19(a-2) is a schematic plan view thereof, FIG. 19(a-3) is the right side elevational view thereof. FIG. 19(b) is an illustration showing a first junction, and FIG. 19(C) is an illustration showing a second junction.

In these figures, reference numeral 141 represents a main body of the microcapsule-forming apparatus, reference numeral 142 represents a microchannel in which a dispersion phase (for example, water) flows, reference numeral 143 represents a microchannel in which a first continuous phase (for example, oil) flows, reference numeral 144 represents a microchannel in which a second continuous phase (for example, water) flows, reference numeral 145 represents the first junction at which flows of the dispersion phase and the first continuous phase are joined together, reference numeral 146 represents the second junction at which flows of the dispersion phase, the first continuous phase, and the second continuous phase are joined together, reference numeral 147 represents the first continuous phase, reference numeral 148 represents the dispersion phase, reference numeral 149 represents an emulsion (for example, water), reference numeral 150 represents the second continuous phase, and reference numeral 151 represents formed microcapsules. The microcapsules 151 can contain one or more emulsions 149.

Figure 20:
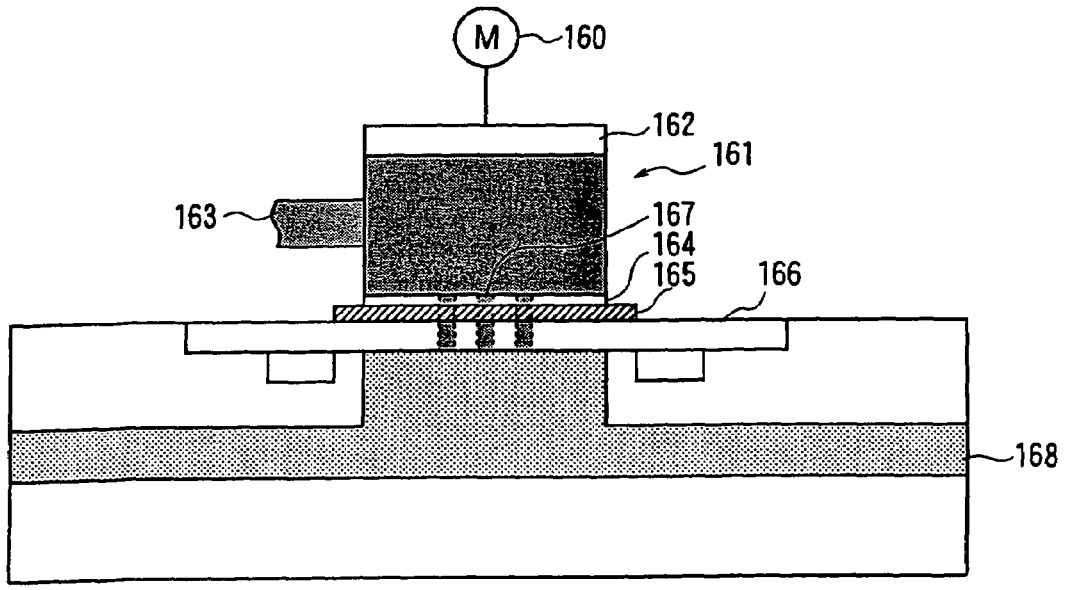
FIG. 20 is an illustration showing a configuration of an apparatus for forming a large amount of microdroplets using the elastic deformation of rubber.
Figure 21:
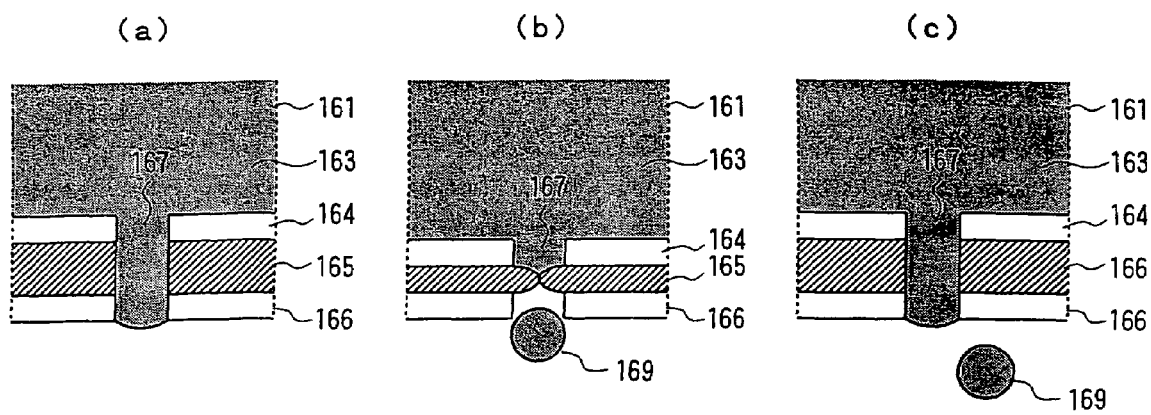
FIG. 21 is an illustration showing the operation of a first apparatus, shown in FIG. 20, for forming a large amount of microdroplets.

FIG. 20 is an illustration showing a configuration of an apparatus of the present invention, wherein the apparatus can be used for forming a large amount of microdroplets (emulsion/microcapsules) using the elastic deformation of rubber. FIG. 21 is an illustration showing the operation of a first forming apparatus therefor.

In these figures, reference numeral 160 represents a linear motor, reference numeral 161 represents a liquid chamber, reference numeral 162 represents a cover, reference numeral 163 represents a dispersion phase, reference numeral 164 represents an upper stainless plate, reference numeral 165 represents a rubber member, reference numeral 166 represents a lower stainless plate, reference numeral 167 represents microchannels, reference numeral 168 represents a continuous phase, and reference numeral 169 represents a formed emulsion (microdroplets). Another actuator including a piezoelectric actuator may be used instead of the linear motor 160 functioning as an actuator.

When the linear motor 160 is operated to apply a pressure to the liquid chamber 161 (see FIG. 21(a)), to which a back pressure is applied, from above, the rubber member 165 disposed between the upper stainless plate 164 and the lower stainless plate 166 is pressed (see FIG. 21(b)) and thereby part of the dispersion phase 163 is separated and then ejected from each microchannel 167, thereby forming the microdroplets 169. In this configuration, since a large number of the microchannels 167 extend through the upper stainless plate 164, the rubber member 165, and the lower stainless plate 166, a large amount of the microdroplets 169 can be readily produced by the operation of the linear motor 160 at a time.

Figure 22:
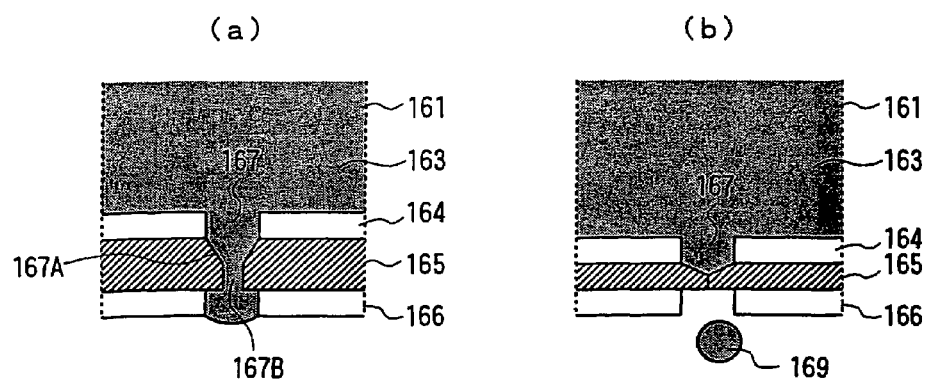
FIG. 22 is an illustration showing the operation of a second apparatus, shown in FIG. 20, for forming a large amount of microdroplets.

FIG. 22 is an illustration showing the operation of a second apparatus, shown in FIG. 20, for forming a large amount of microdroplets.

In this embodiment, a plurality of the microchannels 167 each have a narrow section 167B having a tapered portion 167A formed by narrowing a lower channel portion.

When the linear motor 160 is operated to apply a pressure to the liquid chamber 161 (see FIG. 22(a)), to which a back pressure is applied, from above, the rubber member 165 disposed between the upper stainless plate 164 and the lower stainless plate 166 is pressed from above (see FIG. 22(b)) and thereby part of the dispersion phase 163 is separated and then ejected from each microchannel 167, thereby forming the microdroplets 169. In this configuration, since each microchannel 167 has the narrow lower portion having each tapered portion 167A, the microdroplets 169 can be efficiently ejected in the downward direction.

Figure 23:
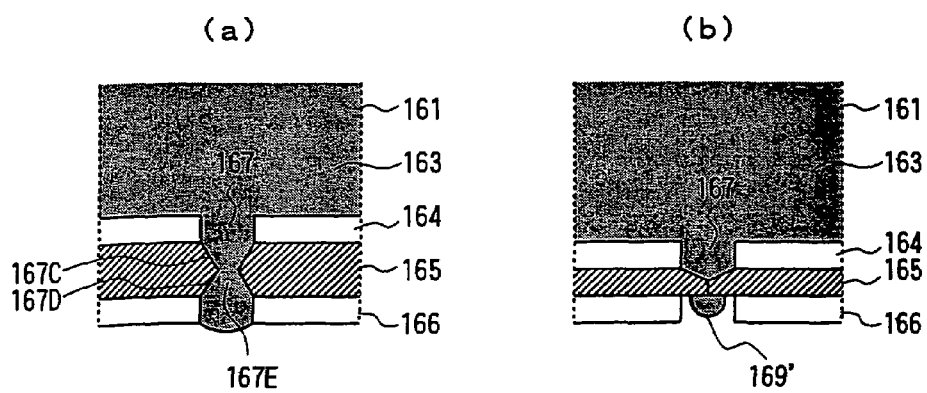
FIG. 23 is an illustration showing the operation of a third apparatus, shown in FIG. 20, for forming a large amount of microdroplets.

FIG. 23 is an illustration showing the operation of a third apparatus, shown in FIG. 20, for forming a large amount of microdroplets.

In this embodiment, a plurality of the microchannels 167 each have a narrow section 167E that has a first tapered portion 167C formed by narrowing a lower channel portion and a second tapered portion 167D formed by expanding a further lower channel portion.

When the linear motor 160 is operated to apply a pressure to the liquid chamber 161 (see FIG. 23(a)), to which a back pressure is applied, from above, the rubber member 165 disposed between the upper stainless plate 164 and the lower stainless plate 166 is pressed from above (see FIG. 23(b)) and thereby part of the dispersion phase 163 is separated and then ejected from each microchannel 167, thereby forming microdroplets 169'. In this configuration, each microdroplet 169' is separated at each microchannel 167 having the first tapered portion 167C, and the microdroplet 169' formed by separating part of the dispersion phase is guided along the second tapered portion 167D in the downward direction and then efficiently ejected.

The present invention is not limited to the above embodiments, and various modifications may be performed within the scope of the present invention. The present invention covers such modifications.

As described above in detail, according to the present invention, an emulsion and microcapsules can be rapidly formed in a simple manner.

Furthermore, the formed emulsion can be guided in a predetermined direction and the rate of forming the emulsion can be varied.

Furthermore, the emulsion can be produced in a large scale.

INDUSTRIAL APPLICABILITY

According to a process and apparatus for producing an emulsion and microcapsules according to the present invention, an emulsion and microcapsules can be rapidly formed in a simple manner. Such a process and apparatus are fit for the field of drug production and biotechnology.

The invention claimed is:

1. An apparatus for producing an emulsion, comprising:
   (a) a microchannel formed on a substrate such that a dispersion phase thereof communicates with a continuous phase thereof;
   (b) a plurality of first parallel electrodes formed in the microchannel on the substrate and in a direction perpendicular to the microchannel and arranged in stripes, a moving electric field applied to the parallel electrodes; and
   (c) a plurality of second parallel electrodes formed on the substrate in a direction of the microchannel and arranged in stripes, wherein a moving electric field is applied to the second parallel electrodes by static electricity on the side of the continuous phase of the downstream of the microchannel.

2. The apparatus for producing an emulsion according to claim 1, wherein the moving speed of the moving electric field applied to the first parallel electrodes is varied, whereby a rate of forming the emulsion is varied.

* * * * *